US012689275B2

(12) United States Patent
Chen et al.

(10) Patent No.: US 12,689,275 B2
(45) Date of Patent: Jul. 21, 2026

(54) LINEAR MOTOR WITH ELASTIC BRACKETS HAVING WELDING TABS WITH ARCUATE EDGE

(71) Applicant: AAC Microtech (Changzhou) Co., Ltd., Changzhou (CN)

(72) Inventors: Weibo Chen, Changzhou (CN); Xiaorong Zhou, Changzhou (CN); Ziyang Zhang, Changzhou (CN); Keyang Wang, Changzhou (CN)

(73) Assignee: AAC Microtech (Changzhou) Co., Ld., Changzhou (CN)

( * ) Notice: Subject to any disclaimer, the term of this patent is extended or adjusted under 35 U.S.C. 154(b) by 208 days.

(21) Appl. No.: 18/539,280

(22) Filed: Dec. 14, 2023

(65) Prior Publication Data

US 2025/0079961 A1      Mar. 6, 2025

Related U.S. Application Data

(63) Continuation of application No. PCT/CN2023/116817, filed on Sep. 4, 2023.

(51) Int. Cl.
*H02K 33/18*          (2006.01)
(52) U.S. Cl.
CPC .................................... *H02K 33/18* (2013.01)
(58) Field of Classification Search
CPC ........ H02K 35/00; H02K 35/02; H02K 33/12; H02K 33/18; H02K 33/00; H02K 33/02;
(Continued)

(56) References Cited

U.S. PATENT DOCUMENTS 3,279,690 A * 10/1966 Masterson ............... G06K 1/02
234/119
8,278,786 B2 * 10/2012 Woo ........................ H02K 33/16
310/15
(Continued)

FOREIGN PATENT DOCUMENTS

CN          216564883 U  *  5/2022
WO      WO-2021168939 A1 *  9/2021    ............. H02K 33/02
WO      WO-2021248534 A1 * 12/2021    ............... H02K 5/04

OTHER PUBLICATIONS

WO-2021248534-A1 English Translation.*

*Primary Examiner* — Maged M Almawri
(74) *Attorney, Agent, or Firm* — Wiersch Law Group

(57)          ABSTRACT

The present application provides a linear motor, including a casing, a vibrator assembly, and elastic brackets. The elastic brackets are arranged on both sides of a vibration direction of the vibrator assembly, including a first fixing portion connected to the casing, a second fixing portion connected to the vibrator assembly, and a connecting portion. An outer surface of the second fixing portion is provided with a welding tab, and the welding tab includes two first side edges arranged relatively parallel to each other and extended along the vibration direction, a second side edge and an arcuate edge connecting the two first side edges. The arcuate edge is protruded in a direction away from the second side edges. The edges of the welding tabs in the linear motor have an arcuate structure, which can improve the stress distribution of the elastic brackets and improve the lifespan of the product.

7 Claims, 3 Drawing Sheets

(58) Field of Classification Search
CPC ........ H02K 33/04; H02K 33/06; H02K 11/30;
H02K 5/04
USPC ........ 310/25, 15, 12.01, 81, 80, 321, 20, 21,
310/28–30, 36–37, 40 MM
See application file for complete search history.

(56) References Cited

U.S. PATENT DOCUMENTS

| | | | | |
|---|---|---|---|---|
| 8,288,898 B2 * | 10/2012 | Jun | ........................ | H02K 33/16 |
| | | | | 310/34 |
| 10,637,339 B2 * | 4/2020 | Liu | ......................... | H02K 1/34 |
| 10,886,827 B2 * | 1/2021 | Liu | ........................ | H02K 33/14 |
| 10,931,185 B2 * | 2/2021 | Tang | ...................... | H02K 33/12 |
| 10,978,941 B2 * | 4/2021 | Tang | ...................... | H02K 33/12 |
| 11,404,948 B2 * | 8/2022 | Liu | ........................ | H02K 33/16 |
| 2011/0006618 A1 * | 1/2011 | Lee | ........................ | H02K 33/16 |
| | | | | 310/25 |
| 2011/0266892 A1 * | 11/2011 | Wauke | ................... | H02K 33/18 |
| | | | | 310/25 |
| 2013/0119785 A1 * | 5/2013 | Han | ...................... | G02B 27/646 |
| | | | | 310/12.16 |
| 2016/0013710 A1 * | 1/2016 | Dong | .................... | H02K 33/16 |
| | | | | 310/25 |
| 2016/0254736 A1 * | 9/2016 | Jin | ........................ | H02K 33/16 |
| | | | | 310/25 |
| 2017/0033657 A1 * | 2/2017 | Mao | ...................... | H02K 33/16 |
| 2018/0021812 A1 * | 1/2018 | Akanuma | ............. | H02K 33/00 |
| | | | | 310/25 |
| 2018/0297075 A1 * | 10/2018 | Ling | ...................... | B06B 1/045 |
| 2018/0297076 A1 * | 10/2018 | Xu | ........................ | B06B 1/045 |
| 2018/0351442 A1 * | 12/2018 | Liu | ........................ | H02K 33/16 |
| 2019/0036435 A1 * | 1/2019 | Zhu | ...................... | H02K 33/02 |
| 2020/0212779 A1 * | 7/2020 | Tang | .................... | H02K 33/16 |
| 2020/0212780 A1 * | 7/2020 | Tang | .................... | H02K 33/18 |
| 2021/0211030 A1 * | 7/2021 | Li | ........................ | H02K 33/18 |
| 2021/0303073 A1 * | 9/2021 | Hori | ...................... | G06F 3/016 |
| 2022/0311319 A1 * | 9/2022 | Cui | ...................... | H02K 33/16 |
| 2022/0320984 A1 * | 10/2022 | Li | ........................ | H02K 33/02 |
| 2023/0378862 A1 * | 11/2023 | Mao | ...................... | H02K 33/16 |
| 2024/0186876 A1 * | 6/2024 | Zhu | ........................ | H02K 33/02 |

* cited by examiner

100

A-A

3

100

LINEAR MOTOR WITH ELASTIC BRACKETS HAVING WELDING TABS WITH ARCUATE EDGE

CROSS-REFERENCE TO RELATED APPLICATIONS

This application is a continuation of International Application No. PCT/CN2023/116817, filed Sep. 4, 2023, the entire contents of which are incorporated herein by reference.

TECHNICAL FIELD

The present application relates to the technical field of linear motors, in particular to a linear motor adopted in the field of mobile electronic products.

BACKGROUND

With the development of electronic technology, there is an increasing demand for mobile electronic products. These electronic products utilize linear motors for system vibration feedback, such as for phone call alerts, message notifications, and vibration feedback in gaming. With such extensive applications, it necessitates high-performance and long-lasting linear motors.

The linear motor in the related art includes a casing, a vibrator accommodated in the casing, a stator, and an elastic bracket. The vibrator includes a mass block and a magnetic circuit system, and the elastic bracket and the mass block are fixed by a welding tab to support the vibrator's reciprocating motion. However, the welding tab in the related art typically rectangular or chamfered in structure, causing the stress on the elastic bracket welded to it to concentrate at several vertices. This can lead to fatigue and rapid wear of the elastic bracket.

Therefore, it is necessary to provide a new linear motor to solve the above technical problems.

SUMMARY

Based on the above technical problems, the present application proposes a linear motor that can improve the stress distribution of the elastic bracket and increase the product life.

In order to achieve the above object, the technical solution of the present application is as follows:

a linear motor, comprising:

a casing having an accommodating space;

a vibrator assembly accommodated in the casing; and a pair of elastic brackets fixed to the casing and arranged on both sides along a vibration direction of the vibrator assembly, comprising:

a first fixing portion connected to the casing;

a second fixing portion connected to the vibrator assembly; and a connecting portion connecting the first fixing portion to the second fixing portion;

wherein an outer surface of the second fixing portion is provided with a welding tab;

the welding tab comprises two first side edges arranged parallel to each other and extended along the vibration direction, a second side edge and an arcuate edge connecting the two the first side edges, wherein the arcuate edge is closer to the connecting portion than the second side edge, and the arcuate edge is protruded in a direction away from the second side edge.

In one embodiment, the second side edge is perpendicular to the vibration direction.

In one embodiment, the arcuate edge is symmetrical along a central axis of the second side edge.

In one embodiment, the first side edges and the second side edge are flush with an edge of the second fixing portion.

In one embodiment, the vibrator assembly comprises a mass block having a mounting cavity and a magnetic circuit structure arranged in the mounting cavity, wherein the mass block is provided with a fixing bump fixed to the second fixing portion, and the fixing bump is shaped in accordance with a shape of the welding tab.

In one embodiment, a foam damping is provided between the connecting portion and the mass block.

In one embodiment, the casing comprises an upper cover and a lower cover arranged opposite to each other, wherein the lower cover is fixedly provided with a stator assembly configured to drive the vibrator assembly to vibrate and a limit block configured to limit the vibrator assembly to move in the vibration direction.

The beneficial effects of the present application are as follows.

In this linear motor, the welding tab for fixing the elastic brackets to the vibrator assembly includes two first side edges arranged parallel to each other and extended in the vibration direction, a second side edge connecting the two first side edges and an arcuate edge. The arcuate edge is closer to the connecting portion of the elastic bracket than the second side edge, and the arcuate edge is protruded in the direction away from the second side edge. The configuration of the arcuate edge improves the stress distribution of the elastic bracket, reduces the loss of the elastic bracket, and enhances the lifespan of the elastic bracket.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

Figure 1:
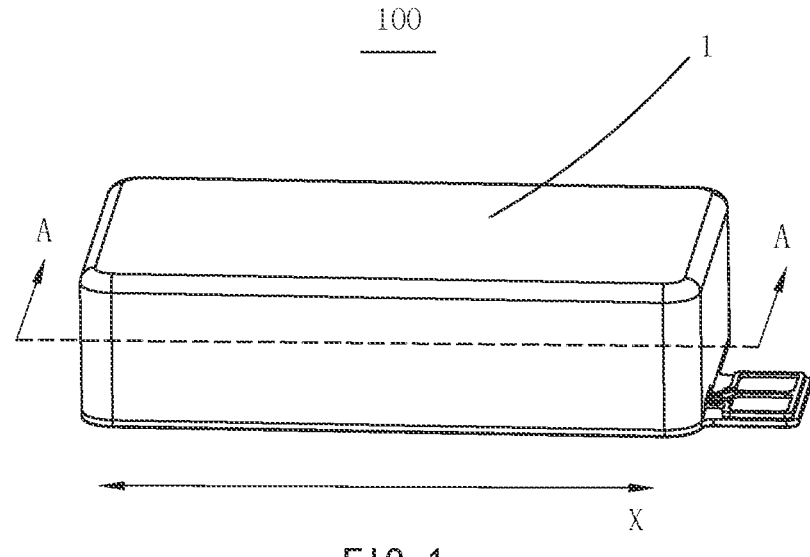
FIG. 1 shows a three-dimensional view of a linear motor according to an embodiment of the present application.

In the figures, 100, linear motor; 1, casing; 11, upper cover; 12, lower cover; 13, accommodating space; 2, vibrator assembly; 21, mass block; 211, mounting cavity; 212, fixing bump; 22, magnetic circuit structure; 221, magnetic steel; 222, magnetic conducting plate; 3, elastic bracket; 31, first fixing portion; 32, second fixing portion; 33, connecting portion; 4, stator assembly; 41, coil; 42, iron core; 43, flexible circuit board; 5, welding tab; 51, first side edge; 52, second side edge; 53, arcuate edge; 6, foam damping; 7, limit block; and X, vibration direction.

DETAILED DESCRIPTION OF THE EMBODIMENTS

The technical solution of the present application will be clearly and completely described below in conjunction with the accompanying drawings in the embodiment of the present application.

As shown in FIG. 1-FIG. 5, the present application provides a linear motor 100 including a casing 1 having an accommodating space 13, a vibrator assembly 2 accommodated in the casing 1, a pair of center-symmetrically arranged elastic brackets 3 fixed to the casing 1 and arranged on both sides along a vibration direction X of the vibrator assembly 2, and a stator assembly 4 fixed to the casing 1 configured to drive the vibrator assembly 2 to vibrate.

The casing 1 includes an upper cover 11 and a lower cover 12 arranged opposite to each other, and the stator assembly 4 is fixed to the lower cover 12.

The vibrator assembly 2 includes a mass block 21 having a mounting cavity 211 and a magnetic circuit structure 22 placed in the mounting cavity 211. The magnetic circuit structure 22 includes a magnetic conducting plate 222 fixed to the mass block 21 and a magnetic steel 221 fixed to the magnetic conducting plate 222. The magnetic conducting plate 222 is configured to converge the magnetic lines of force of the magnetic steel 221 so as to enhance the performance of the magnetic field of the linear motor 100.

The elastic bracket 3 includes a first fixing portion 31 connected to the casing 1, a second fixing portion 32 connected to the mass block 21 and a connecting portion 33 connecting the first fixing portion 31 to the second fixing portion 32. An outer surface of the second fixing portion 33 is provided with a welding tab 5.

The stator assembly 4 includes a core 42 arranged in correspondence with the magnetic steel 221, a coil 41 wound on the core 42 and a flexible circuit board 43 fixed to the lower cover 12 and electrically connected to the coil 41. The coil 41 is energized and then interacted with the magnetic steel 221, so that the elastic bracket 3 drives the mass block 21 to reciprocate along the vibratory direction X, thereby providing a vibratory sensation.

Figure 4:
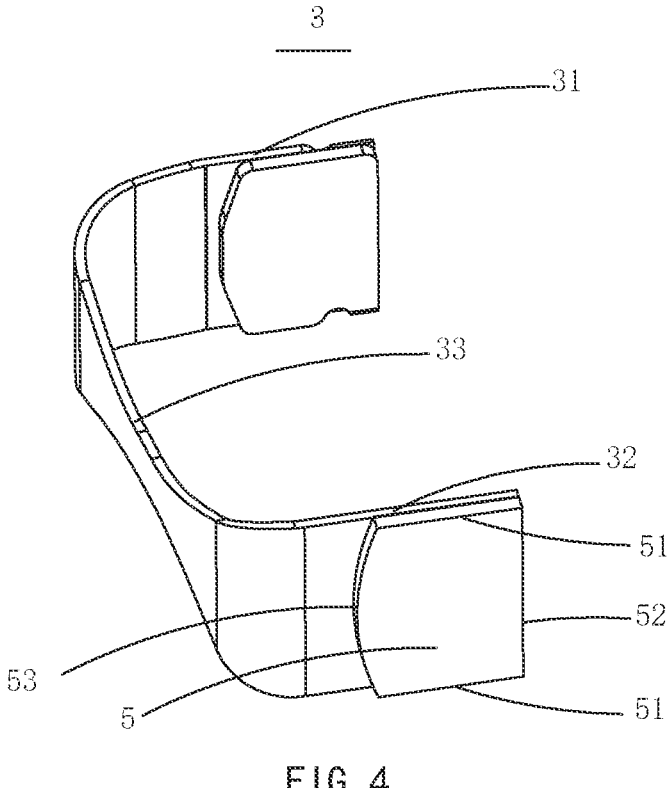
FIG. 4 shows a three-dimensional view of an elastic bracket and a welding tab of the linear motor according to an embodiment of the present application.
Figure 5:
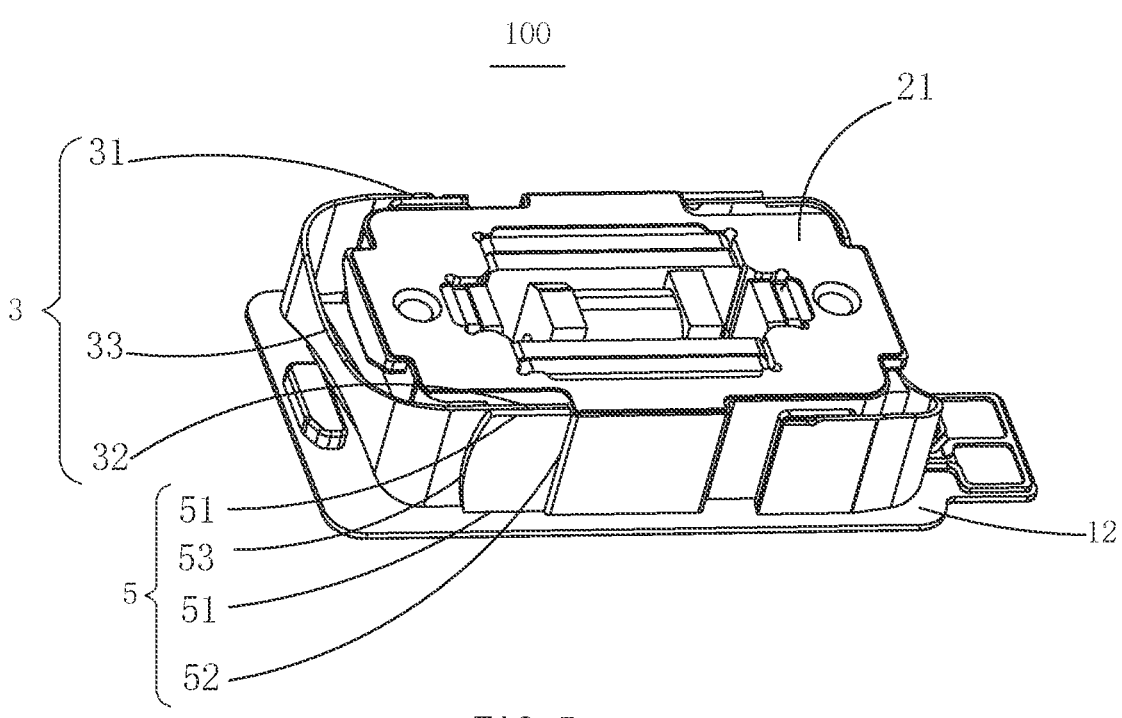
FIG. 5 shows a three-dimensional view of the linear motor with a top cover removed according to an embodiment of the present application.

As shown in FIG. 4, the welding tab 5 includes two first side edges 51 arranged relatively parallel to each other and extended along the vibration direction X, and a second side edge 52 and an arcuate edge 53 connecting the two the first side edges 51. The arcuate edge 53 is closer to the connecting portion 33 than the second side edge 52, and the arcuate edge 53 is protruded in a direction away from the second side edge 52. The second side edge 52 is perpendicular to the vibration direction X, and the arcuate edge 53 is symmetrical along a central axis of the second side edge 52. The first side edges 51 and the second side edge 52 are flush with an edge of the second fixing portion 32.

Figure 3:
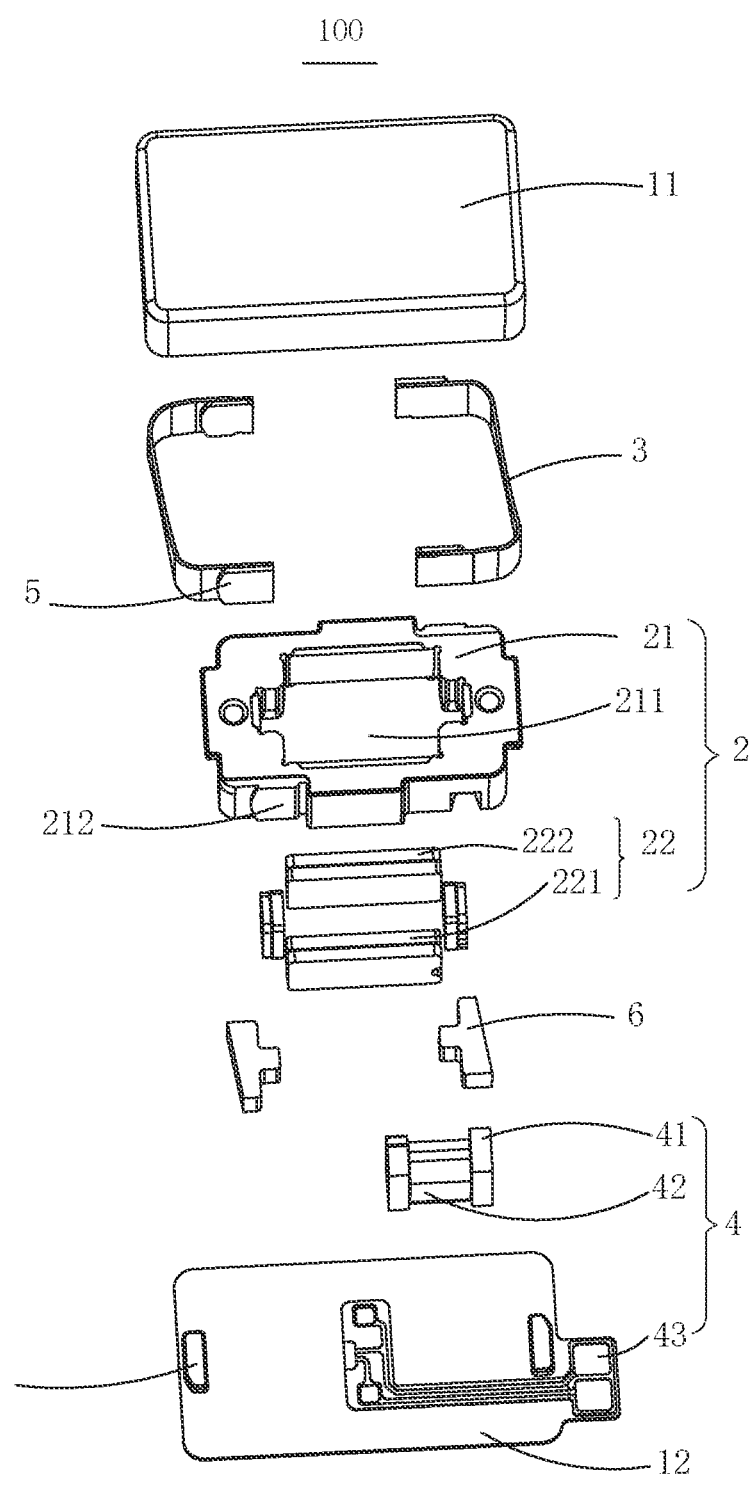
FIG. 3 shows a three-dimensional exploded view of the linear motor according to an embodiment of the present application.

In an embodiment, as shown in FIG. 3, the mass block 21 is provided with a fixing bump 211 fixed to the second fixing portion 32. The fixing bump 211 is shaped in accordance with the shape of the welding tab 5, to ensure uniform force when the second fixing portion 33 of the elastic holder 3 is fixed to the mass block 21.

Figure 2:
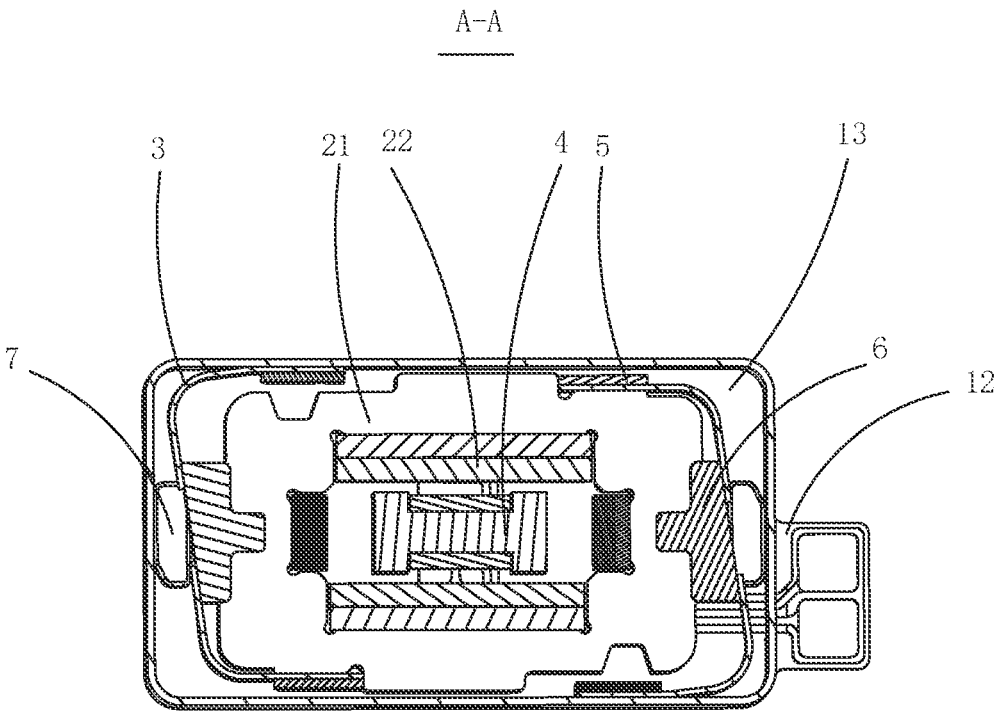
FIG. 2 shows a sectional view along line A-A in FIG. 1.

In one embodiment, as shown in FIG. 2, in order to prevent noise from being generated by the collision of the connecting portion 33 of the elastic bracket 3 with the mass block 21 during vibration, and to improve the vibration damping of the vibrator assembly 2, a foam damping 6 is provided between the connecting portion 33 and the mass block 21.

In one embodiment, as shown in FIGS. 2-3, the lower cover 12 is fixedly provided with a limit block 7 configured to limit the movement of the vibrator assembly 2 in the vibration direction X.

Compared with the related art, the present application provides a linear motor, in which the welding tab is changed from a rectangular or chamfered structure to an arcuate structure, thereby improving the stress distribution of the elastic bracket, reducing the loss of the elastic bracket, and enhancing the lifespan of the elastic bracket.

Described above are only some embodiments of the present application, and it should be noted herein that improvements may be made by those of ordinary skill in the art without departing from the inventive conception of the present application, but all of these fall within the protection scope of the present application.

What is claimed is:

1. A linear motor, comprising:
a casing having an accommodating space;
a vibrator assembly accommodated in the casing; and
a pair of elastic brackets fixed to the casing and arranged on both sides along a vibration direction of the vibrator assembly, comprising:
a first fixing portion connected to the casing;
a second fixing portion connected to the vibrator assembly; and
a connecting portion connecting the first fixing portion to the second fixing portion;
wherein an outer surface of the second fixing portion is provided with a welding tab; the welding tab comprises two first side edges arranged parallel to each other and extended along the vibration direction, a second side edge and an arcuate edge connecting the two the first side edges, wherein the arcuate edge is closer to the connecting portion than the second side edge, and the arcuate edge is protruded in a direction away from the second side edge.

2. The linear motor of claim 1, wherein the first side edges and the second side edge are flush with an edge of the second fixing portion.

3. The linear motor of claim 1, wherein the casing comprises an upper cover and a lower cover arranged opposite to each other, wherein the lower cover is fixedly provided with a stator assembly configured to drive the vibrator assembly to vibrate and a limit block configured to limit the vibrator assembly to move in the vibration direction.

4. The linear motor of claim 1, wherein the second side edge is perpendicular to the vibration direction.

5. The linear motor of claim 4, wherein the arcuate edge is symmetrical along a central axis of the second side edge.

6. The linear motor of claim 1, wherein the vibrator assembly comprises a mass block having a mounting cavity and a magnetic circuit structure arranged in the mounting cavity, wherein the mass block is provided with a fixing bump fixed to the second fixing portion, and the fixing bump is shaped in accordance with a shape of the welding tab.

7. The linear motor of claim 6, wherein a foam damping is provided between the connecting portion and the mass block.

* * * * *